Sept. 17, 1963   M. E. TROXELL   3,103,946
SYSTEM FOR PREVENTION OF PIPE FREEZING
Filed Dec. 14, 1959   2 Sheets-Sheet 1
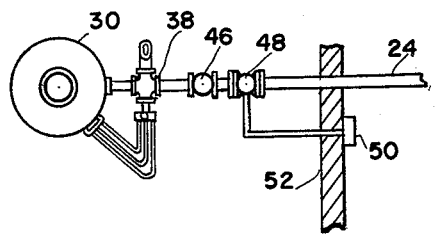
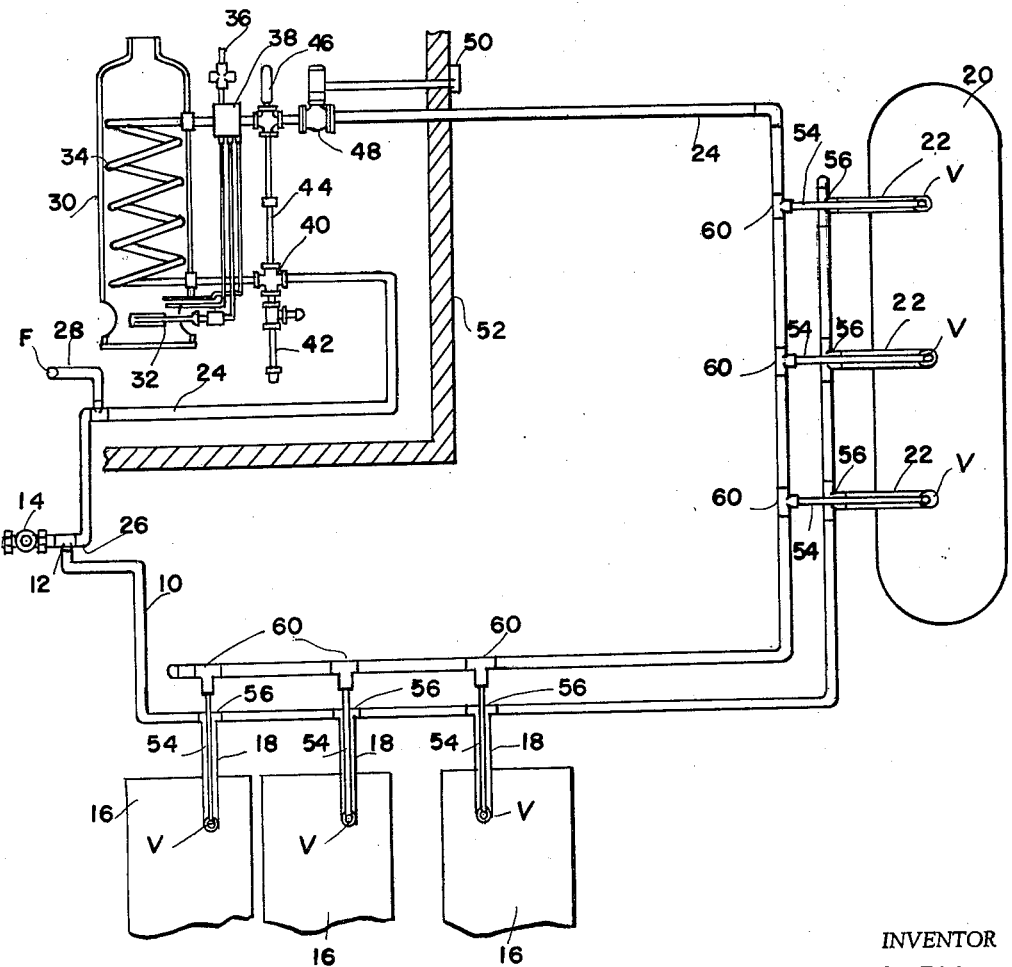
INVENTOR
MONTE E. TROXELL Sept. 17, 1963 M. E. TROXELL 3,103,946
SYSTEM FOR PREVENTION OF PIPE FREEZING
Filed Dec. 14, 1959 2 Sheets-Sheet 2
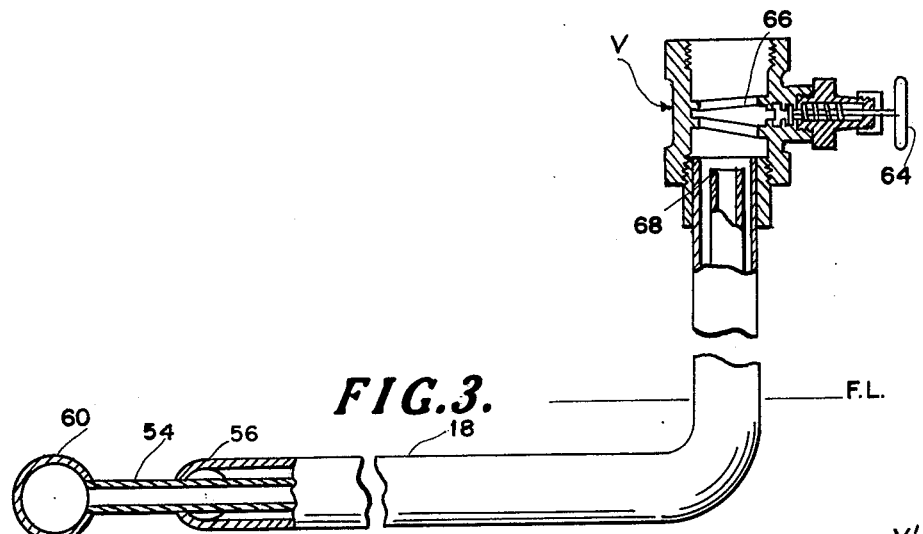
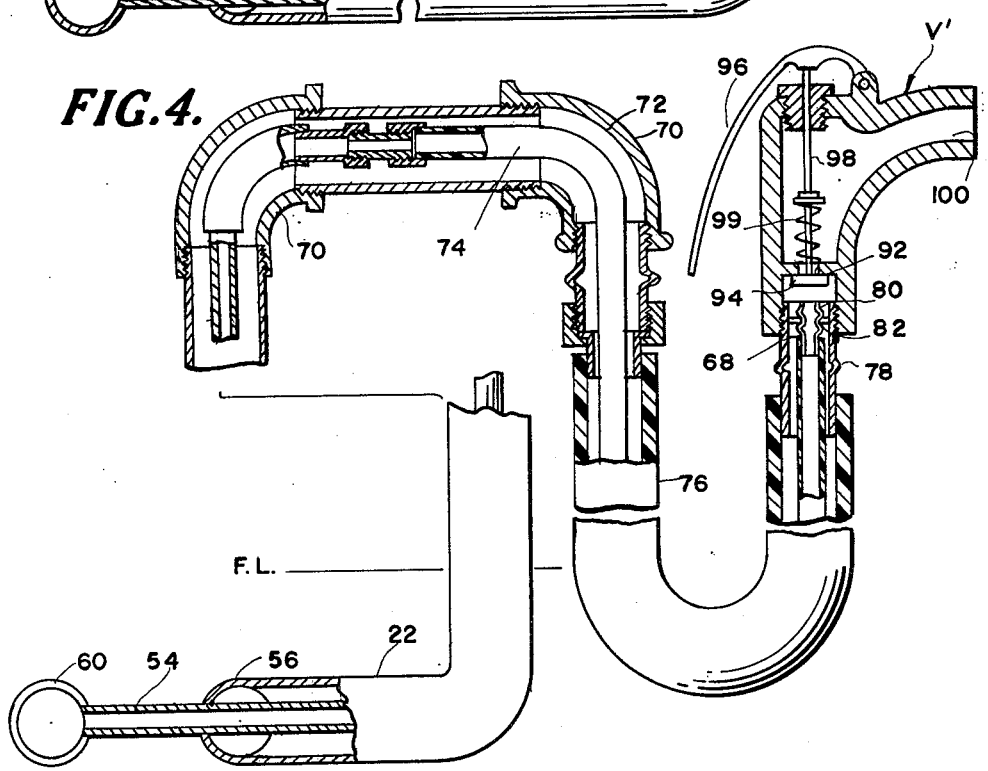
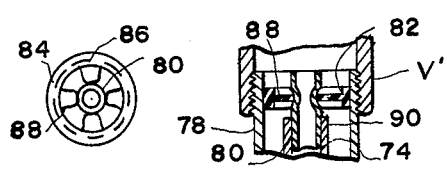
INVENTOR
MONTE E. TROXELL
BY Cushman, Darby & Cushman
ATTORNEYS

United States Patent Office 3,103,946
Patented Sept. 17, 1963

3,103,946
SYSTEM FOR PREVENTION OF PIPE FREEZING
Monte Evan Troxell, 2005 W. Marshall, Tulsa, Okla.
Filed Dec. 14, 1959, Ser. No. 859,335
2 Claims. (Cl. 137—337)

This invention relates to fluid systems, and more particularly to means for preventing the freezing of fluid within a portion of the system during cold weather operations.

One of the problems encountered in outdoor fluid systems is the freezing of the pipes or valves disposed above the frost line of the ground during periods of cold weather. If the fluid system is continuously in use during cold weather the possibility of the fluid contained within the system of freezing is substantially reduced in that the fluid is continuously moving through the pipes or valves. However, should the fluid be allowed to remain stationary within the pipes or valves for a prolonged period of cold weather, the possibility of the fluid freezing and therefore rupturing the pipes or damaging the valves is presented.

This invention particularly relates to an outdoor fluid system, described in detail below for illustrative purposes as being the water lines of a combined gasoline and trailer court installation. This invention contemplates the prevention of the freezing of water within the system by circulating warm water through a pipe concentrically mounted within the normal supply line. When a valve connected to one of the outlets of the system of this invention is closed, the warm water passing through the inner of the concentric pipes will be discharged from the inner pipe slightly upstream from the valve seat and will, due to its being under greater pressure than the supply, travel towards the source of supply through the supply pipe, thus effectively heating the water through the supply pipe to prevent it from freezing. By disposing the heated water conduit within the supply pipe, the water within the supply pipe is initially heated through the heat exchange relationship of the two pipes and is further heated and kept in continuous circulation by the admixture of the warm water passing out of the inner concentric pipe.

It is an object, therefore, of this invention to provide a system for supplying fluid to a valve and to provide for the continuous circulation of the fluid even when the valve is closed to prevent the freezing of the fluid.

It is another object of this invention to provide an improved circulating means for a fluid system to prevent the freezing of the fluid, which circulating means is automatically actuated by the advent of cold weather.

Still another object of this invention is to provide means for preventing the freezing of a fluid within a conduit wherein a warm fluid is introduced into the conduit under pressure to continuously circulate the fluid within the conduit to prevent freezing.

A further object of this invention is to provide in combination with a supply conduit having a discharge valve at one end, a concentrically disposed inner conduit through which a heated fluid is pumped to heat the fluid in the supply conduit in a heat exchange relationship, and to further provide for a continuous circulation of the heated fluid and the supply fluid even when the valve is closed.

These and further objects and advantages will be readily apparent to those skilled in the art upon reading the following detailed description taken in conjunction with the appended drawings, in which:

FIGURE 1 is a schematic view of the apparatus and system of this invention;

FIGURE 2 is a partial top plan view of the heater unit of FIGURE 1;

FIGURE 3 is a side elevational view partially in section of one embodiment of installation of the conduits;

FIGURE 4 is a view corresponding to FIGURE 3 but showing a modified form of installation;

FIGURE 5 is a plan view on enlarged scale of the spacer ring shown in FIGURE 4; and FIGURE 6 is a fragmentary view on enlarged scale of the spacer ring mounting shown in FIGURE 4.

Referring now to FIGURE 1, there is shown schematically the apparatus of the present invention installed in a gasoline service station and trailer court. A water supply conduit 10 having one of its ends 12 in communication with the usual source of water, here indicated as a service meter 14, extends from the water service meter 14 to a series of trailer court installations 16 and has an outlet branch 18 for each. The supply conduit continues on to the usual service station island 20 and is there provided with a plurality of spaced service outlets 22. Each of the outlets 18 and 22 is provided with a flow control valve V so that any one of the outlets 18 or 22 may be selectively employed. In the normal installation, supply line 10 will be buried beneath the ground sufficiently so that it lies below the frost line and each of the outlets 18 and 22 extends upwardly therefrom through the surface of the ground so that the valves V secured on their ends are readily accessible. A second conduit 24 has one of its ends 26 in communication with the service meter 14 and end 12 of conduit 10 and may be provided with an outlet, or outlets, 28 having faucets F mounted in its open end to supply water to the service station wash or restrooms.

The second conduit 24 is connected to a conventional gas-operated fluid heater 30 having the usual gas burner 32 and spiral coil 34 through which the fluid to be heated passes. Gas heater 30 is connected, as at 36, to a suitable supply of gas and includes a thermostat 38 for controlling the water temperature that is heated thereby. In the particular installation shown, the conduit 24 is connected to a standard 4-way connector 40 which has one of its branches in communication with a sediment leg 42 and another of its branches in communication with a thermo-syphon line 44 which has its other end connected to a thermometer 46 to indicate the temperature of water passing from the heater 30. A centrifugal pump 48 is mounted upon the second conduit 24 downstream from the heater 30 and is selectively actuated by a thermostat 50 mounted outside of the gas station house 52. The pump 48 is of such a construction as will permit fluid at line pressure to pass therethrough when not in operation, but which, when actuated, will effectively operate to pass water through the second conduit 24 at a pressure exceeding that of the supply line. The second conduit 24 has a plurality of spaced branch outlets 54 which coincide with the outlets 18 and 22 of supply conduit 10. Outlets 54 are adapted, as by the conventional cross T 56, to extend concentrically within and in heat exchange relationship with outlets 18 and 22. The major portion of conduit 24 downstream from the pump 48 is similarly buried beneath the frost line of the ground, as is conduit 10 and the outlets 54 extend upwardly from beneath the frost line and concentrically within outlets 18 and 22 of supply conduit 10. The upper or outermost ends 68 of outlets 54 are in free communication with the interior of outlets 18 and 22 upstream of the valves V mounted thereon.

Referring now to FIGURE 3, there is shown a typical trailer court valve installation. Conduit 24 shown in FIGURE 1 is connected to a copper T 60 here shown with an outlet 54 extending therefrom and through a cross fitting 56 connected to supply conduit 10 so that outlet 54 is disposed concentrically within outlet 18 and extends upwardly therewith above the frost line, F.L. A valve V, here shown as a gate valve having the usual operating handle 64 and valve plate 66, is mounted upon the outer or upper end of the outlet 18. The upper end 68 of outlet 54 is open and in free communication with the interior of outlet 18, at a position slightly upstream of valve plate 66.

In FIGURE 4, there is shown the preferred service station island installation in which the outlet 54 of the second conduit 24 leads from a T 60 through the cross fitting 56 and then concentrically within outlet 22 from a position below the frost line F.L. upwardly toward the service station island. In this embodiment the outlet 54 comprises a ½" diameter copper tubing, and the outlet 22 comprises a 1" diameter copper tubing. At a position above the frost line and near the service station island position, the copper tubings 54 and 22 are connected by suitable adapters 70 and 72 to flexible conduits 74 and 76 which respectively constitute extensions of outlet 54 and the outlet 22. A flow control valve V' is connected to the end of hose 76 by the adapter 78. The outer end 68 of flexible hose 74 is concentrically disposed within the adapter 78 by means of a tubular adapter 80 and spacer ring 82. Spacer ring (FIG. 5) comprises a circular portion 84 which is made of rubber and has a stainless steel wire 86 embedded therein and is further provided with radially inwardly facing lugs 88 which engage the adapter 80 about a reduced portion 90 to accurately center the hose 74 with respect to the hose 76 and valve V'. Valve V' has a valve seat 92 and valve plate 94 concentrically disposed with respect to the upper ends of hoses 74 and 76 with the valve plate 94 being disposed between the valve seat 92 and the upper ends of the hoses. When the valve plate 94 is moved downwardly to an open position by means of the lever 96 and valve stem 98, against the action of coil spring 99, the valve plate will restrict the amount of fluid passing outwardly from the end of hose 74 without restricting the outward flow of fluid from the end of hose 76 so that when the valve is opened more fluid from hose 76 will pass by valve seat 92 and the discharge nozzle 100, than will fluid from the hose 74.

In normal warm weather operation, water under main pressure will enter the system through the service meter 14 and flow through each of the conduits 10 and 24. The water flowing through conduit 10 passes through the conduit and into its outlets 18 and 22, while the water passing through conduit 24 will pass into its outlets 28 and also through coil 34 of heater 30 through the pump 48 and into the outlets 54. If a valve, as shown in FIGURE 3, is to be used, water will pass from conduit 10 through the outlet 18 and upwardly through the valve V. Similarly, water passing through conduit 24 will pass through its outlet 54, which is concentrically disposed within the outlet 18 and upwardly so as to be discharged from its upper end 68 along with the water passing through the outlet 18. Similarly, if the valve of FIGURE 4 is to be used, fluid passing through conduits 74 and 76 will be discharged past the valve seat 92 when the valve plate 94 is moved downwardly. In cold weather operation, when there is a chance of water freezing the outlets 18 and 22 and valves V disposed above the frost line, the concentric arrangement of outlets 54 of the second conduit 24 and outlets 18 and 22 of supply conduit effectively prevents such freezing. During periods of cold weather, the heater 30 is operated and the burner 32 may be controlled by the thermostat 38. Some of the water coming from service meter 14 passes through second conduit 24 and through the coil 34 of heater 30 where it is heated. The amount of heat, depending on outside weather conditions, is controlled by the thermostat 38 connected to the burner 32 and gas supply 36. The water thus heated passes through the thermometer 46, so the service station attendant may readily see that the system is performing properly, and into the centrifugal pump 48 mounted downstream of the heater 30 in communication with second conduit 24. A thermostat 50 mounted so as to be responsive to weather conditions, is connected to the pump 48 so that when the temperature falls to a point where water in outlets 18 and 22 might freeze, the pump 48 is actuated to pump the heated water through second conduit 24 and into its outlets 54. The portion of water coming from service meter 14 that passes through conduit 10 and its outlets 18 and 22 will stand in outlets 18 and 22 when the valves V are closed, and if the period of inactivity is long enough, the standing water will normally tend to freeze and cause the valves to freeze or pipes to burst above the frost line.

However, as outlets 18 and 22 are in heat exchange relationship with and are concentrically disposed about the outlets 54 of the second conduit, freezing is prevented. When the valves V are closed, the heated water in outlets 54 due to pump 48 is under greater pressure than the water standing in conduit 10 and its outlets 18 and 22. Therefore, the heated water will pass through the outlets 54 and heat the water in outlets 18 and 22 which surrounds them. Additionally, the heated water discharged from the open ends 68 of conduits 54 becomes mixed with the water in outlets 18 and 22 and flows therealong and through conduit 10 toward the service meter 14 and then into second conduit 24, its outlets 28, and back toward the heater 30. It is the continual circulation of heated water and the concentric mounting of outlets 54 within outlets 18 and 22 that effectively prevents any freezing when the valves V are closed. As only a portion of the heated water in conduit 24 passes into each of its outlets 54, a plurality of outlets 18 and 22 may be kept from freezing even if one of the valves V be open. In the particular form of valve illustrated in FIGURE 4, more cold water than hot will pass through discharge nozzle 100 because when the valve plate 94 is opened by moving it downwardly, the valve plate 94 restricts the flow of hot water from the hose 74 which is, in effect, an extension of the outlet 54 of the second conduit 24. If the valve plate 94 is moved to a full open position, the flow of hot water from the hose 74 may be stopped completely, allowing only the discharge of the cold water of outlet hose 76.

If either the standard form of valve is used or the particular valve disclosed in FIGURE 4, the system will effectively prevent the freezing of water in a plurality of outlets arranged in series. Of course, the particular system here disclosed is not limited to the particular installation here described, nor is it restricted to use with water only. Any fluid which is susceptible of freezing may be employed and any desired installation may be constructed without departing from the scope of this invention.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

What is claimed is:

1. Apparatus for preventing the freezing of a fluid within a fluid system comprising: a supply conduit having one of its ends in communication with a fluid source and having at least one outlet; a flow control valve connected to said outlet; a second conduit disposed in heat exchange relationship and within a portion of said supply conduit, one end of second conduit in communication with a source of heated fluid and the other of its ends in communication with said supply conduit and said valve upstream from said valve; means to selectively pump heated fluid through said second conduit, the fluid in said supply conduit and said second conduit passing outwardly through said valve when it is opened, and the heated fluid passing through said second conduit and then through said supply conduit toward said fluid source when said valve is closed when said heated fluid is being pumped, said valve having means allowing more fluid in said supply conduit than in said second conduit to pass therethrough.

2. The structure defined in claim 1 in which said valve is concentrically mounted with respect to the said outlet and said second conduit and has a centrally disposed valve seat and valve plate, said valve plate when moved to an open position restricting the flow of heated fluid passing from said second conduit through said valve.

References Cited in the file of this patent

UNITED STATES PATENTS

| | | |
|---|---|---|
| 1,295,687 | Bullard | Feb. 25, 1919 |
| 1,541,719 | Lacourciere | June 9, 1925 |
| 1,663,685 | Doughty | Mar. 27, 1928 |
| 2,922,469 | Rowe | Jan. 26, 1960 |
| 2,932,313 | Noland | Apr. 12, 1960 |